United States Patent [19]

Whitehead

[11] Patent Number: 4,813,036
[45] Date of Patent: Mar. 14, 1989

[54] FULLY INTERCONNECTED SPOT BEAM SATELLITE COMMUNICATION SYSTEM

[75] Inventor: Clay T. Whitehead, McLean, Va.

[73] Assignee: National Exchange, Inc., McLean, Va.

[21] Appl. No.: 802,990

[22] Filed: Nov. 27, 1985

[51] Int. Cl.[4] .............................................. H04Q 11/02
[52] U.S. Cl. ..................................... 370/57; 370/69.1; 455/12
[58] Field of Search .......................... 370/57, 69.1, 104; 455/12, 13

[56] References Cited

U.S. PATENT DOCUMENTS

| | | | |
|---|---|---|---|
| 4,090,036 | 5/1978 | Stott et al. | 455/12 |
| 4,339,816 | 7/1982 | Reed | 370/124 |
| 4,513,413 | 4/1985 | Gorman et al. | 370/124 |
| 4,528,656 | 7/1985 | Morais | 370/69.1 |

FOREIGN PATENT DOCUMENTS

| | | | |
|---|---|---|---|
| 0150339 | 9/1983 | Japan | 455/12 |
| 0048629 | 3/1985 | Japan | 455/12 |

OTHER PUBLICATIONS

"A Satellite System with Limited-Scan Spot Beams" by Acampora et al., IEEE Trans. on Comm., vol. COM-27, No. 10, Oct. 1979; pp. 1406-1415.

*Primary Examiner*—Douglas W. Olms
*Attorney, Agent, or Firm*—Lyon & Lyon

[57] ABSTRACT

A communication signal can be routed from any location in a spot beam satellite system to any other location within the spot beam system by simply choosing the proper carrier frequency for the uplink to the satellite. The spot beams are fully interconnected without any need for active switching within the satellite. An uplink signal received by one or more satellites in a particular orbit location may be routed, depending on its frequency, to any downlink spot beam. A network control center located on the ground in one of the spot beam coverage areas receives signalling requests from all the spot beam coverage areas and assigns frequencies so that the desired routing can be established. All of this is accomplished without any signal demodulation or active switching of circuit paths in the satellite.

6 Claims, 8 Drawing Sheets

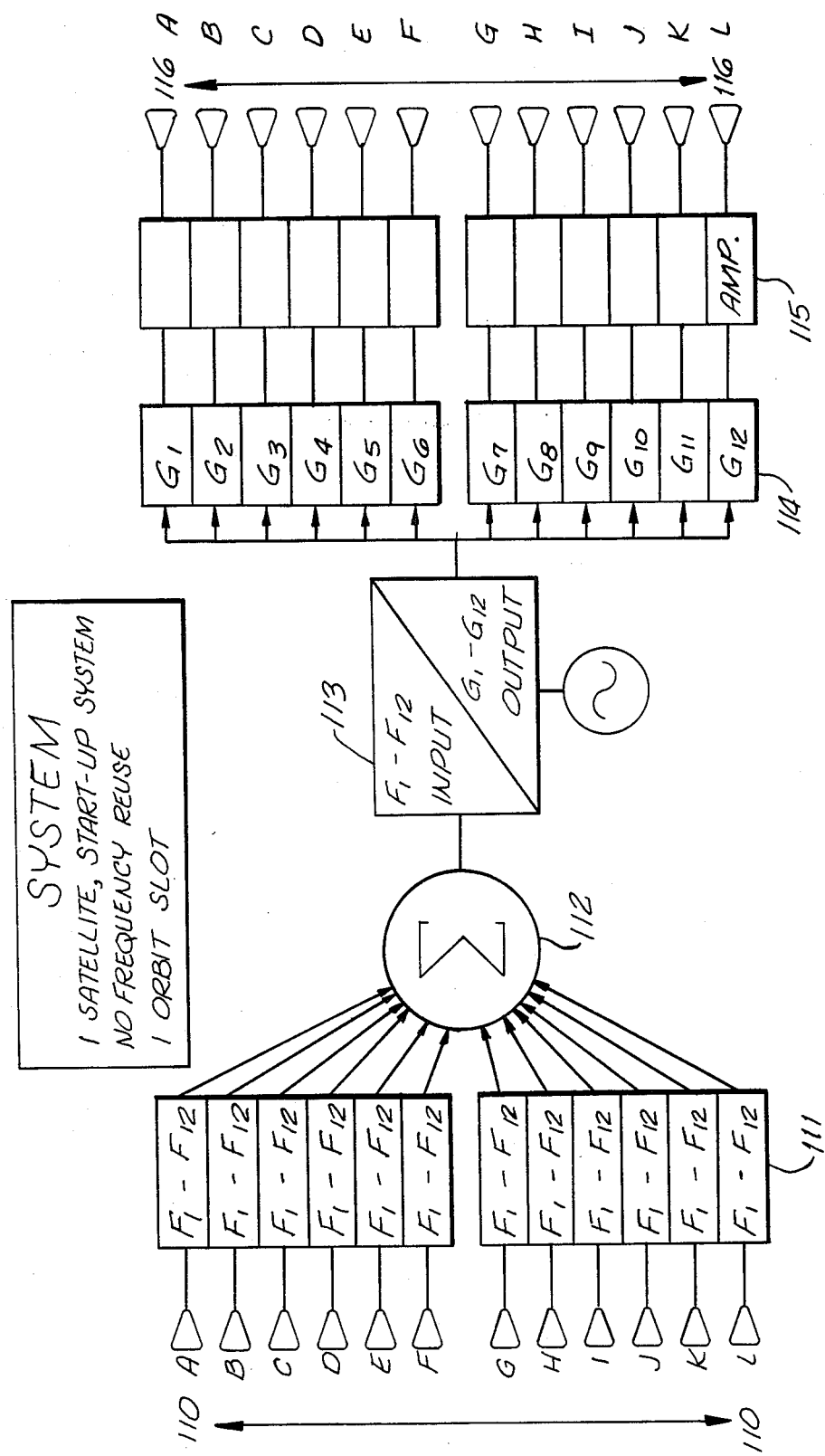

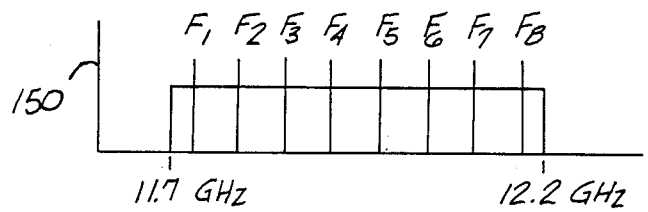
FIG. 10B.
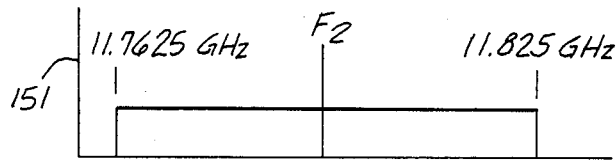
FIG. 10C.
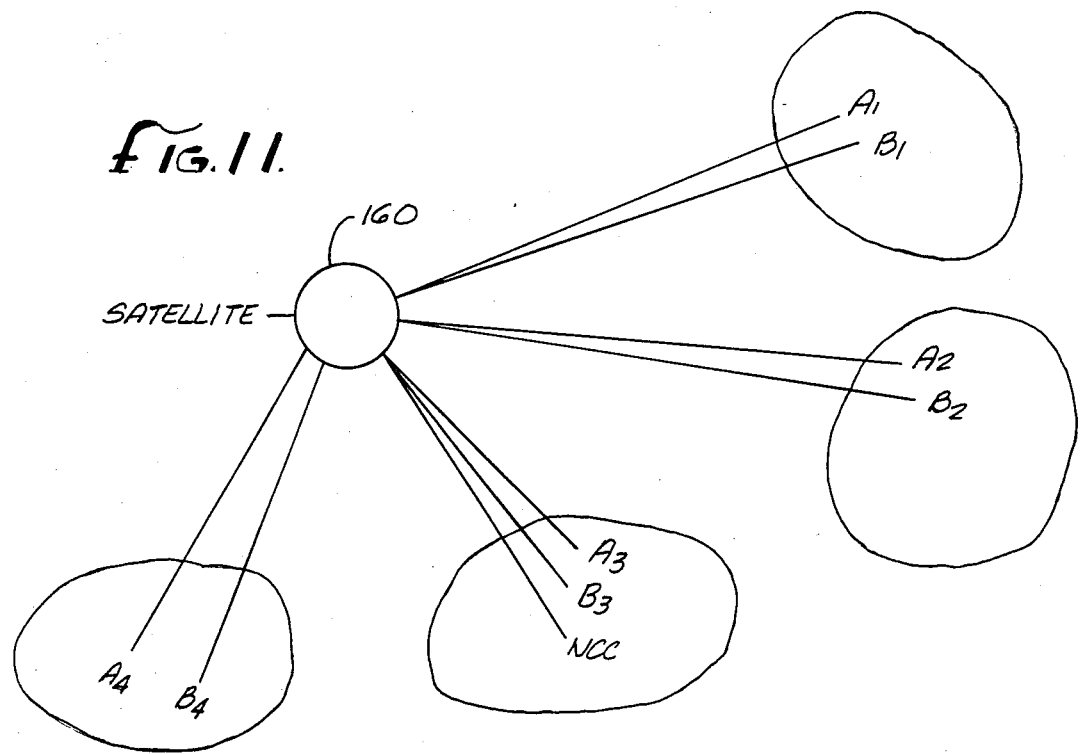
FIG. 11.
FIG. 12.

FULLY INTERCONNECTED SPOT BEAM SATELLITE COMMUNICATION SYSTEM

BACKGROUND OF THE INVENTION

In a single beam satellite system, all the transponders operate through the same antenna beam, so that an earth station anywhere in the coverage area of the beam can communicate with another earth station anywhere else in the coverage area. This includes satellites where a single beam is constructed by combining separate geographic coverage area beams into a functionally single beam which operates through all or a group of transponders on the satellite. In a spot beam satellite system, either one transponder or a group of transponders operate in conjunction with receive and transmit antenna beams that have a coverage area that is geographically distinct from the coverage areas of other receive and transmit antenna beams operating with other transponders or groups of transponders.

Using multiple spot beams to provide communications over a large geographic area instead of using a large single beam has certain well-known advantages. However, it is generally necessary to provide full interconnectivity from any part of the overall coverage area to any other part, i.e., from any one spot beam coverage area to any other. This interconnectivity can be achieved by providing a suitably large number of transponders on the satellite. In a spot beam system with two spot beams, for example, four conventional transponders are necessary to achieve full two-way interconnectivity between the beams. Each path from beam to beam requires a separate transponder as shown in FIG. 3 and as follows:

| From | To | Transponder |
| --- | --- | --- |
| Beam A | Beam A | No. 1 |
| Beam A | Beam B | No. 2 |
| Beam B | Beam A | No. 3 |
| Beam B | Beam B | No. 4 |

For a coverage area with only two spot beams, the need for separate transponders for each possible route from beam to beam is not too onerous to implement. However with a larger number of spot beams, the number of transponders required for full interconnectivity increases dramatically as shown below.

| Number of Spot Beams | Number of Transponders |
| --- | --- |
| 2 | 4 |
| 4 | 16 |
| 6 | 36 |
| 8 | 64 |
| 16 | 256 |

The increasingly large number of transponders quickly exceeds the capabilities of a single satellite. While several satellites could be co-located to accommodate such a large number of transponders, there would not be complete interconnection of beams until all the satellites were operational, and continuity would be lost in the event of a satellite failure. The use of separate transponders for each path among the spot beams, therefore, is not a very practical approach. However, satellite systems employing many small spot beams would be attractive economically and operationally if the problems created by a large number of transponders could be avoided. The commonly accepted conclusion is that this problem can be solved only by demodulation, switching and remodulation of signals on-board the satellite. However, such techniques are heavy, expensive and not yet proven technologically for most commercial applications.

With on-board switching, signals from each uplink are received, demodulated, and then switched to the appropriate downlink beam for modulation and transmission to the correct spot beam coverage area. This reduces the number of transponders required for "N" spot beams from $N^2$, as required without switching, to N. However, because of the weight, cost, and complexity of this active switching arrangement, it would be useful to devise a practical system in which the switching occurs without on-board demodulation so that the satellite is passive rather than an active switching device.

Thus, to have full interconnectivity of separate spot beams, the number of transponders will be very large when there are any significant number of spot beams or there must be complicated on-board demodulation and switching.

For purposes of this application, the following terms are used as indicated below.

"Beam" is used to refer to a spot beam covering a portion of the total satellite coverage area or to a larger beam covering the same area as a number of spot beams up to and including the entire coverage area of the satellite. If differentiation between a spot beam and a larger beam is important to the discussion, it will be clear from the context which is meant. Where beams are intended to be functionally independent so that there will be no interference among beam signals, several means of separation can be used including geographic separation of coverage areas, disjoint frequency utilization, and orthogonal wave polarization. In the discussion and figures in this application it is assumed that spot beams are kept separate by one or more of these techniques unless otherwise indicated.

"Route" as a noun is used to refer to an electronic path through a satellite or to an electronic path from one earth station to another.

"Routing" as a verb is used to refer to the selection of signal parameters such as frequency, polarization, and timing such that a signal is made to follow an appropriate route through a satellite or from one earth station to another.

"Switching" is used to refer to the selection of signal parameters for routing together with necessary commands to earth stations so that a communications route is established for a period of time between or among desired earth stations.

"Transponder" is used to refer to the equipment that typically constitutes a single path, functionally separate from all other paths, for electronic signals through a satellite.

SUMMARY OF THE INVENTION

The system of the present invention relates to a satellite communications system in which an earth station in any one spot beam coverage area can communicate to an earth station in the same or any other spot beam coverage area without a large number of transponders or active switching in the satellite. Each uplink signal received by a satellite from a spot beam coverage area is routed to a single specific downlink spot beam depending on the carrier frequency involved. The routing technique can be characterized by a frequency-selective routing array (FSRA) in the satellite. The signal is routed by assigning to the earth stations at each end of a communications link an appropriate uplink frequency ($F_N$) that will result in the correct routing. A network control center (NCC) located on the ground in one of the spot beam coverage areas receives signalling requests and assigns frequencies so that the desired route will be established. This use of a NCC on the ground and a FSRA in the satellite is referred to as frequency assigned switching (FAS).

Using spot beams also allows the reuse of frequencies, thereby enlarging the total potential capacity of a single satellite orbit position. If a frequency spectrum is used in area A, and area A is geographically remote from area B, that same frequency spectrum may also be used in area B. This, of course, will increase the total bandwidth available for transmission of signals beyond that which is possible in a single beam system.

Accordingly, it is an object of the present invention to provide an improved communication system.

It is another object of the present invention to provide a spot beam satellite communication system that is fully interconnected without using active switching in the satellite and without the need for $N^2$ transponders where N is the number of spot beam coverage areas.

It is another object of the invention to provide a satellite communication system wherein higher effective isotropically radiated power is obtained over a wide geographic coverage area by use of multiple spot beams and low-power amplifiers such that total satellite power is not increased and interconnectivity among all points of the coverage area is maintained.

It is a further object of the present invention to provide a satellite communication system in which small earth stations are able to transmit signals to and receive signals from a satellite at lower power levels and/or higher information rates.

Another object of the present invention is to provide a satellite communication system that permits the reuse of frequencies and thereby increases the overall efficiency of a valuable public resource.

BRIEF DESCRIPTION OF THE DRAWINGS

FIG. 8 shows a block diagram for a single satellite system with no frequency reuse.

FIGS. 10B and 10C show how the frequency spectrum could be divided in each region.

FIG. 11 shows a system where there are several earth stations in each spot beam coverage area.

FIG. 12 a chart showing an increase in frequency reuse achieved by using wave polarization isolation for adjacent regions.

DETAILED DESCRIPTION OF THE PREFERRED EMBODIMENT

Figure 1:
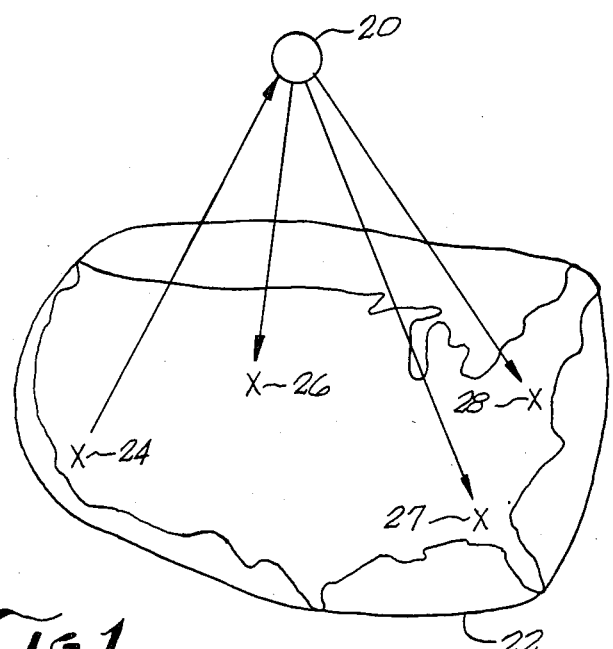
FIG. 1 shows a satellite communication system in which a satellite transmits a beam that covers the whole area of the 48 contiguous United States.
Figure 2:
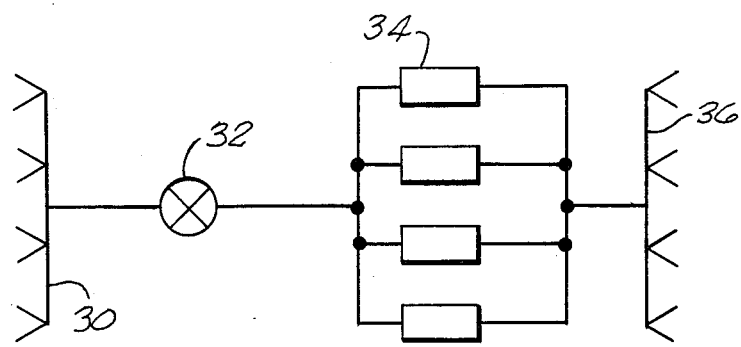
FIG. 2 shows a functional block diagram for the single beam satellite shown, in FIG. 1.

A typical single beam satellite which covers an entire area, such as the United States, is shown in FIG. 1. A single beam satellite 20 receives a signal from a ground station 24 and transmits it to other ground stations such as ground stations 26, 27, and 28. Coverage of the large area 22 by the single beam satellite 20 requires greater power for transmissions from the satellite 20 than would be required of a spot beam system of the present invention covering the same area. FIG. 2 shows a simplified block diagram of the single beam satellite 20. An input antenna array 30 collects an uplink signal which is received and translated in frequency by receiver and frequency translator 32, processed through output amplifiers and channel filters 34 and sent to the output antenna array 36 for transmission to other ground stations.

Figure 3:
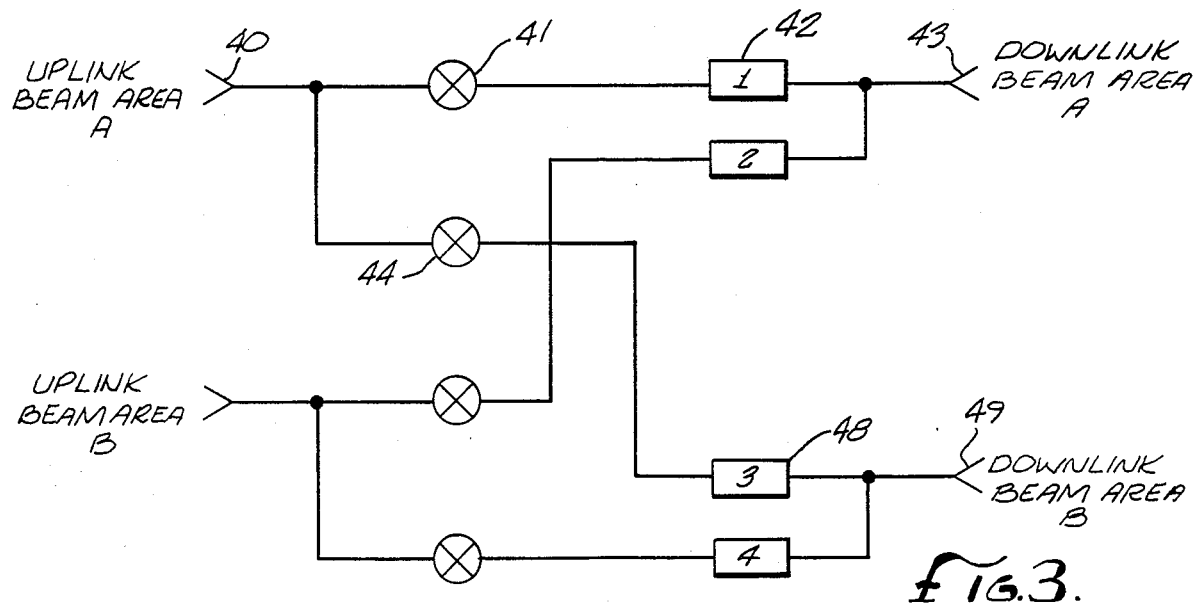
FIG. 3 shows a simplified block diagram of a typical satellite system with two functionally separate spot beams.

A conventional satellite system with two functionally separate spot beams is shown in FIG. 3. An uplink signal transmitted from spot beam area A to uplink antenna 40 can be retransmitted to spot beam area A via receiver and frequency translator 41, power amplifier and filter 42 and downlink antenna 43, or it can be transmitted in a similar manner to spot beam area B via receiver and frequency translator 44, power amplifier and filter 48 and downlink antenna 49. For full interconnectivity, four transponders are required for a two spot beam system. For a larger system using the same design approach, such as an eight spot beam system, 64 transponders would be required to achieve full interconnectivity.

Figure 4A:
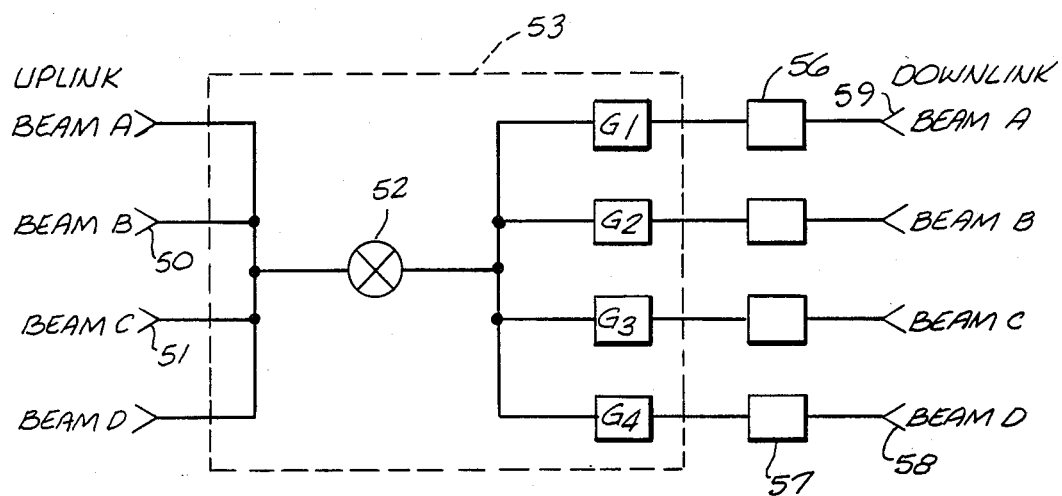
FIG. 4A is a simplified block diagram of a satellite using the system of the present invention, FIG. 4B shown a system for reduced receiving antenna noise

The simplest case of frequency assigned switching (FAS) according to the present invention uses a single satellite with no frequency reuse and with N spot beams and N transponders. A frequency-selective routing array (FSRA) is shown in FIG. 4A, in which, as an example, N is equal to 4. This is a single satellite system with a FSRA 53 which has twice the number of spot beams for the same number of transponders as the conventional satellite system shown in FIG. 3. For the purpose of explanation, the uplink frequencies are divided into four ranges, $F_1$ through $F_4$, and the corresponding translated downlink frequencies are divided into four ranges $G_1$ through $G_4$. This correlation is common for transponder frequency allocations in satellites. Uplink beams A through D and downlink beams A through D are assumed to cover essentially the same geographic area, although this coverage pattern may be altered to meet the needs of any particular system. If a signal is transmitted from spot beam area B on a carrier frequency in the $F_1$ range, then it is received by uplink antenna 50 and receiver and frequency translator 52 in FSRA 53. The signal is translated to a frequency in the $G_1$ range and is then transmitted to the filters $G_1$ through $G_4$ Filters $G_2$ through $G_4$ will reject the signal, and the signal will be passed by filter $G_1$. It is then amplified by amplifier 56 and transmitted to the spot beam coverage area A by downlink antenna 59. In a similar manner if the signal transmitted from spot beam area C to uplink antenna 51 and receiver and frequency translator 52 is in the frequency range $F_4$, it is translated to the $G_4$ frequency range and routed to filters $G_1$ through $G_4$. In this case, filters $G_1$ through $G_3$ will reject the signal and filter $G_4$ will pass the signal to amplifier 57 and downlink antenna 58. The signal is then transmitted to the spot beam area D via downlink antenna 58.

Figure 5:
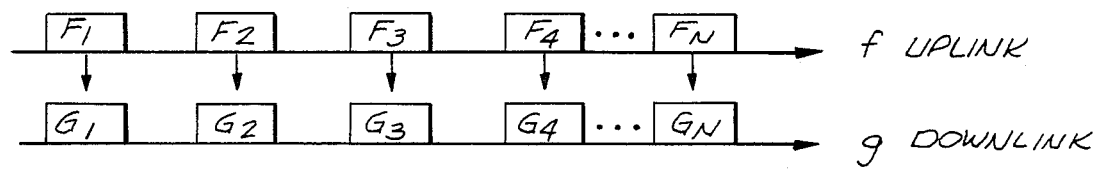
FIG. 5 shows a frequency translation chart associated with FIG. 4A.

FIG. 5 shows a frequency translation chart associated with FIG. 4A. Any signal from any spot beam coverage area that is transmitted on a carrier frequency in the range $F_1$ will be supplied to all filters $G_1$ through $G_N$; however, as shown in FIG. 5, only filter $G_1$ will pass a signal in the $F_1$ frequency range, and consequently only the spot beam coverage area corresponding to $G_1$ frequency range will receive that signal. A similar description applies to signals in the other ranges $F_2$ through $F_N$. Therefore, the route of the signal through the satellite and hence the route of the circuit from one spot beam to another is determined by the assignment of the uplink carrier frequency.

Because the geographic area covered by each spot beam is smaller than the total coverage area of all spot beams, the amplifier power is concentrated, yielding higher effective isotropically radiated power (E.I.R.P.) than a conventional single beam satellite with the same amplifier power. Such a satellite has high effective downlink power in each spot beam coverage area to help realize the objective of a small, low cost earth station.

The FSRA as shown in FIG. 4A achieves the benefit of spot beam performance on the downlink, but the uplink receiving antenna gain and noise figure is more nearly that of the single beam system, shown in FIG. 2, because all of the uplink antennas are connected in parallel. This noise figure can be improved by an FSRA design like that shown in FIG. 4B. By adding fractional bandpass filters 61 in the FSRA 60, each output amplifier receives no more noise per Hertz than it would in the conventionally interconnected spot beam design of FIG. 3. There is a range of satellite configurations between those of FIG. 4A and FIG. 4B using the same principle of frequency assigned switching as shown by the example of FIG. 4C.

Figure 4C:
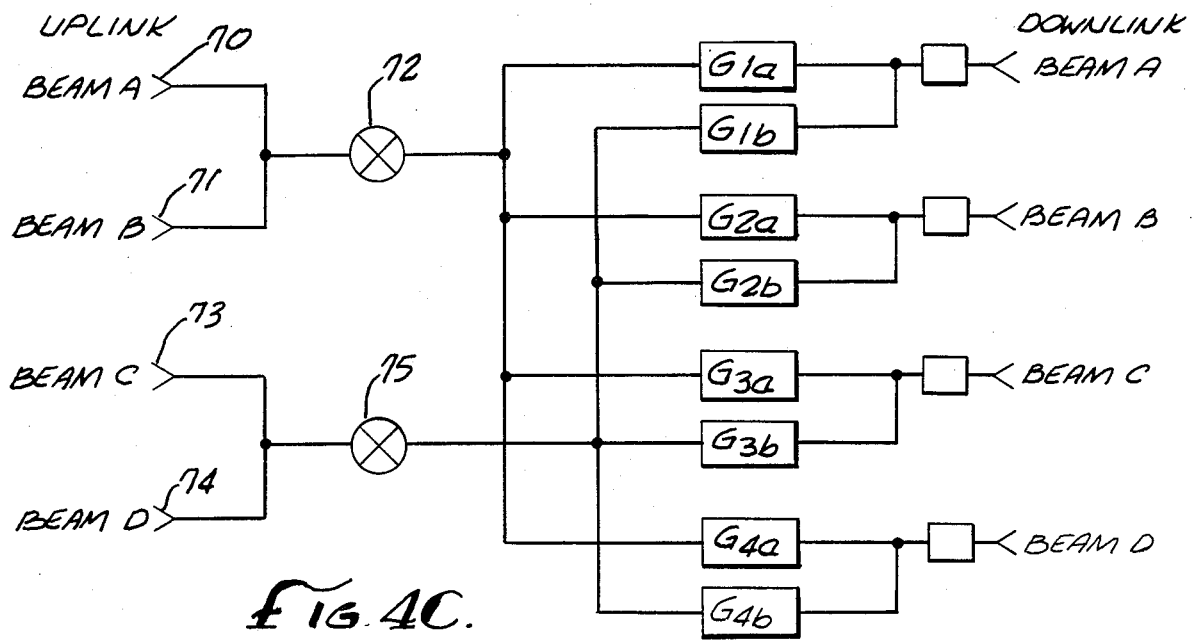
FIG. 4C is a simplified block diagram combining advantages shown in FIGS. 4A and 4B.
Figure 4B:
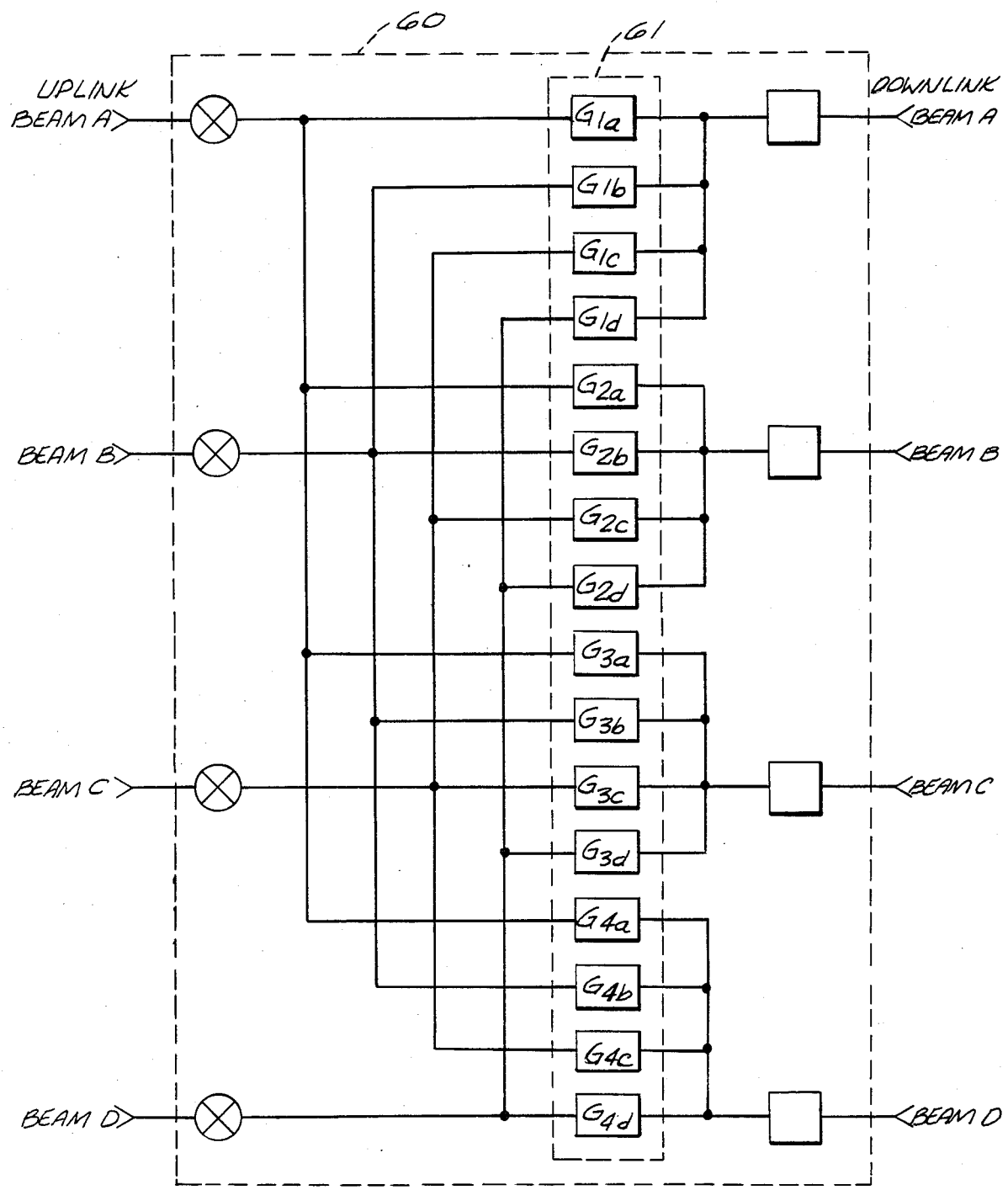

FIG. 4C shows uplink antennas 70 and 71 connected in parallel to a receiver and frequency translator 72. The signals received from spot beam areas A and B on uplink antennas 70 and 71 are processed through receiver and frequency translator 72, the output of which is connected in parallel to fractional filters $G_{1a}$ through $G_{4a}$. The signals received from spot beam areas C and D are received on uplink antennas 73 and 74 which are connected in parallel to receiver and frequency translator 75. Receiver and frequency translator 75 is in turn connected in parallel to a set of fractional filters $G_{1b}$ through $G_{4b}$. This arrangement reduces the noise figure encountered in the system shown in FIG. 4A by decreasing the number of uplink antennas that are connected in parallel. However, this arrangement increases the number of frequency translators and fractional filters that are used.

The above discussion has not dealt with the way in which multiple signals are sent through each transponder. All the different methods of multiplexing in time and frequency can be used, separately or in combination. Shown here are how two specific schemes can be used, Single Channel per Carrier/Demand Assigned Multiple Access (SCPC/DAMA) and Time Division Multiple Access (TDMA). The switching procedure is essentially the same in both cases. The SCPC/DAMA switching procedure will be discussed first and the discussion will cover a satellite of the type shown in FIG. 4A, although the same arrangement works for the multiple satellites shown in FIG. 9.

Figure 6:
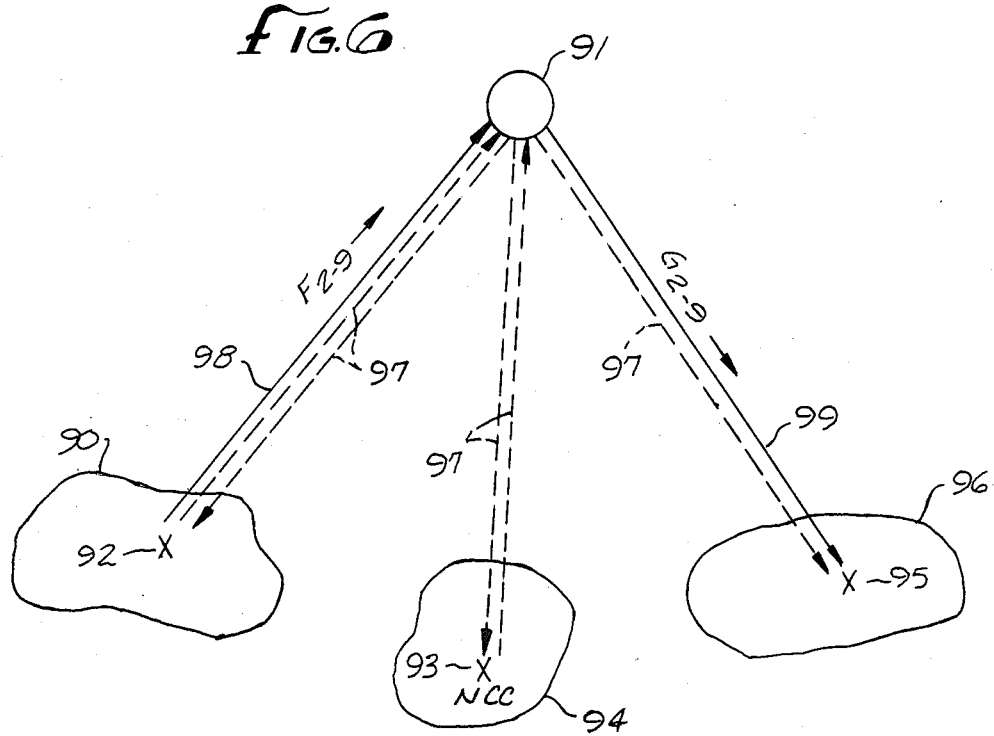
FIG. 6 shows a satellite communication system with a ground based network control center.

The system of FIG. 6 shows one way in which a network control center 93 (NCC) can control, by frequency assignment, an FSRA in a satellite 91 of the type shown in FIG. 4A. Earth station 92 in the spot beam coverage area 90 initiates a circuit request to communicate with earth station 95 in the spot beam coverage area 96. This request is sent on a separate signalling channel or in a special code on a normal channel to a NCC 93 located in, for example, spot beam coverage area 94. The NCC 93 selects an unused SCPC/DAMA channel for earth station 92 transmissions to earth station 95. The NCC 93 selects for example a frequency in the $F_2$ range, number 9 slot, which can be called frequency $F_{2-9}$. The choice must be in the $F_2$ range so that it will be translated by the FSRA to the $G_2$ range which is transmitted to spot beam area 96. The NCC 93 then signals earth station 92 that it should transmit on frequency $F_{2-9}$ and signals earth station 95 that it should receive on frequency $G_{2-9}$. These request and assignment signals are shown as dotted transmission path lines 97 in FIG. 6. Earth station 92 then can begin transmitting on frequency $F_{2-9}$ and the signal will be received by earth station 95 on frequency $G_{2-9}$ as shown by the solid transmission lines 98 and 99 in FIG. 6. Of course, if a two-way circuit were required, the NCC would select an unused frequency, for example $F_{1-6}$, in the $F_1$ range for use by earth station 95, which will be translated to a frequency $G_{1-6}$ for reception by earth station 92. Note that this switching can be accomplished in real time or certain frequencies and time slots can be pre-assigned or downloaded to earth stations from time to time so that switching need not involve the NCC and a double-hop switching process as shown by lines 97.

The NCC keeps track of all frequencies in use and selects the unused frequencies (or pairs of frequencies for two-way circuits) to achieve the desired communication links. The centralized switching of the NCC provides significant economies for a large area network and is conducive to easy and inexpensive add-on functions such as billing, directory access, data-base services, etc. This is possible because the "switch" (i.e., the active or intelligent controller) is on the ground, where it can be changed or added to easily, unlike the situation with on-board satellite switching. This technique also avoids double-hop signalling when accessing a data base located at the NCC.

If the individual frequencies in each range are not used for a full communications channel, they can be subdivided in time by TDMA as well as by frequency. This combination of frequency and time slot assignment can be characterized as Multi-Frequency Time Division Multiple Access (MFTDMA). If, for example, each frequency range has a 1.544 Megabits per second (Mbps) capacity and a communication circuit requires only 64 Kilobits per second (Kbps), the NCC would assign not only frequency $F_{2-9}$, but also a time division slot. If a third time slot were free and assigned to this circuit, the MFTDMA transmission assignment in frequency and time for earth station 92 would be $F_{2\text{-}9\text{-}3}$ and the receive assignment for earth station 95 would be $G_{2\text{-}9\text{-}3}$. In this case, the NCC would keep track of frequency and time slot availability in assigning communication paths.

Figure 7A:
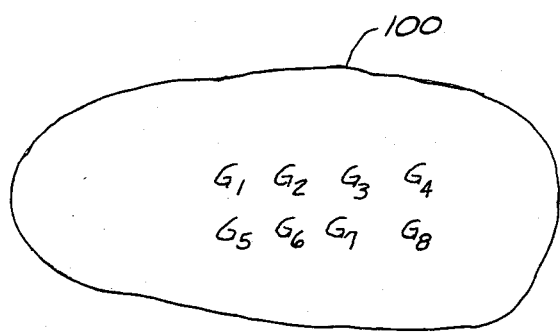
FIG. 7A shows coverage of an area by a single beam and FIG. 7B shows spot beam coverage of the same area with frequency reuse.
Figure 7B:
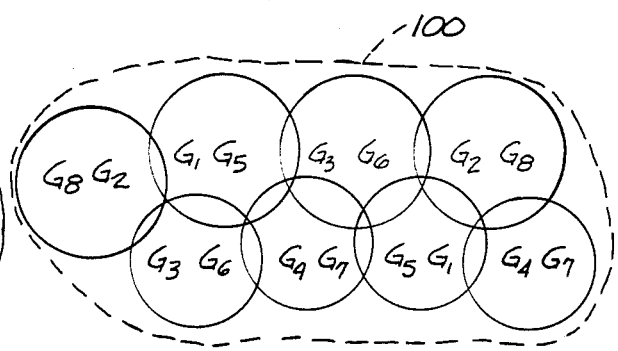

One of the desirable features of spot beams is that frequencies can be reused over the satellite coverage area, unlike coverage with a single beam system as in FIG. 1. This is illustrated in FIGS. 7A and 7B, where it is shown that each frequency range can be used twice, in two spot beam areas, instead of just once as in a single beam system. FIG. 7A shows that frequencies $G_1$ through $G_8$ can be used once in the coverage area 100 with a conventional single beam satellite system. FIG. 7B shows the same coverage area 100 with spot beams which allow each of the frequencies $G_1$ through $G_8$ to be used twice. This is possible since the $G_1$ frequency range, for example, is present in two non-overlapping spot beam coverage areas, and an earth station in one such coverage area would not receive interference from the $G_1$ signal in another such coverage area.

FIG. 8 shows a more complicated system of the present invention having twelve separate spot beam areas. The coverage areas of uplink antennas 110A through 110L represent 12 geographically separate spot beam areas A through L (not shown). Signals received by the uplink antennas 110A through 110L are transferred to twelve identical broad band preamplifiers. The signals from these preamplifliers are summed by summing circuit 112 and transferred to the frequency translator 113, the filters 114, the amplifiers 115 and then to the downlink antennas 116A through 116L. If a user of the system in coverage area A desires to communicate with a user in coverage area H, then the earth station in area A transmits on a carrier frequency in the $F_8$ range, which is translated to the $G_8$ frequency range and passed only by filter $G_8$. The output of filter $G_8$ is routed to coverage area H via its associated amplifier 115 and downlink antenna 116H. Thus, this system allows any of the coverage areas A through L to communicate with any of the other coverage areas A through L on an independent basis.

Figure 9:
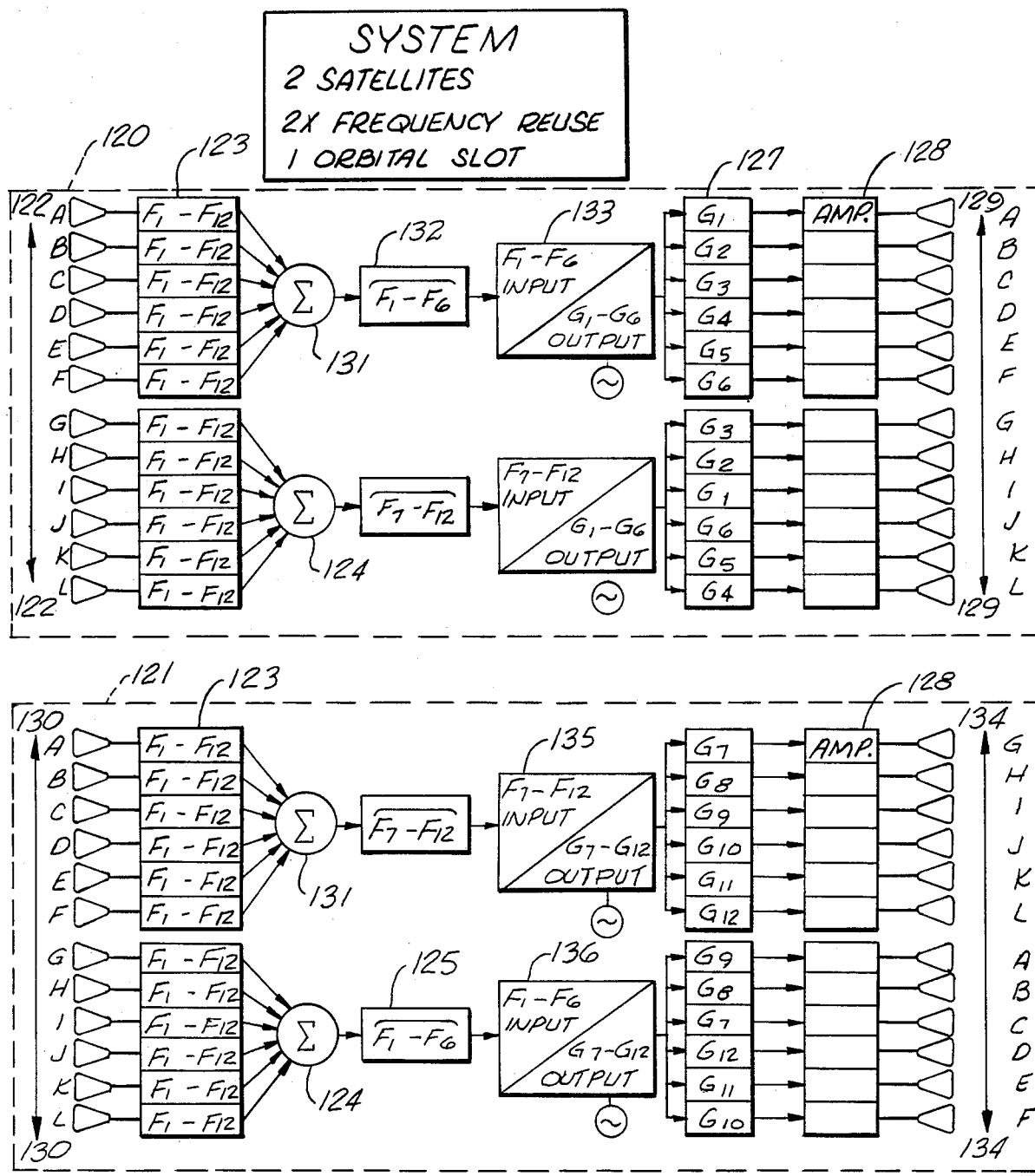
FIG. 9 shows a block diagram of a two-satellite system with frequency reuse.

A second satellite like that shown in FIG. 8 could be co-located with the first, but this would be a less efficient addition since both satellites would receive and repeat all signals. This can be overcome by the FSRA arrangement shown for two satellites in FIG. 9. By having two summing circuits 124 and 131 in each of the two satellites 120 and 121, the frequency use is doubled. In satellite 120 coverage areas A through F use frequencies $F_1$ to $F_6$ and their associated broad-band preamplifiers 123. The signals from those broad-band preamplifliers are summed by summing circuit 131 and filtered by filter 132 from the remaining channels and then translated on a one-on-one basis to downlink channels $G_1$ through $G_6$ by translator 133. Each downlink channel $G_1$ through $G_6$ is then individually filtered out of a composite signal, at the output of translator 133, by the filters 127 and amplified by the associated amplifiers 128, and fed to the appropriate downlink antennas 129A through 129F. The remaining channels are handled by an identical process, the difference occurring only in the associated coverage areas and channels used, as indicated in FIG. 9. The satellite 121 is configured in a similar fashion, except that the downlink frequencies $G_7$ through $G_{12}$ are used by translators 135 and 136 instead of frequencies $G_1$ through $G_6$ and uplink frequencies $F_1$ through $F_6$ serve uplink spot beam areas G through L, through filter 125, instead of spot beam areas A through F as in satellite 120.

Routes between earth stations can now be described. Suppose that an earth station in spot beam coverage area A wants to communicate with an earth station in spot beam coverage area B. Reference to FIG. 9 shows that area B is served by downlink channel $G_2$ on the satellite 120 and by the downlink channel $G_8$ on satellite 121. Thus, when an earth station in coverage area A makes a request, the NCC could assign a carrier frequency within the uplink frequency range $F_2$ which would be translated by satellite 120 to downlink frequency range $G_2$. Similarly, a frequency in range $F_8$ could be assigned and would be translated by satellite 121 to frequency range $G_8$, and the earth station in coverage area B would then be commanded to receive on the appropriate frequency in range $G_8$. If area A is transmitting to area B on frequencies in range $F_2$, then area H can also transmit to area B on a frequency in range $F_8$ because frequency range $F_2$ is translated to downlink frequency range $G_2$ in satellite 120 and frequency range $F_8$ is translated to downlink frequency range $G_8$ in satellite 121. Thus each frequency can be used twice and any earth station can reach any other earth station.

Simple, well within the state-of-the-art, one-time reconfiguration of the first satellite must occur when the second satellite is added to change it from the configuration of FIG. 8 to FIG. 9, or to change it back to the original configuration should one of the satellites fail to operate satisfactorily.

Although not discussed above, the satellite system of FIG. 8 could have an additional identical twelve-transponder sub-system on board the satellite that would provide coverage to exactly the same areas, but with orthogonal wave polarization. Such a single-satellite system can provide full frequency reuse by using both horizontal and vertical wave polarizations, and the two-satellite system of FIG. 9 can double that capacity by providing geographic frequency reuse in separate spot beams on both wave polarizations.

Note that there are many other arrangements of uplink and downlink beam combinations that could allow more extensive frequency reuse. In some configurations the arrangement of uplink beams and their coverage areas could be the limiting factor, while in other configurations the arrangement of downlink beams would be the limiting factor. Note also that as more frequency reuse is achieved at an orbit position, a larger number of routes can be accessed by a single earth station.

Although application of this system's routing and switching technique has been discussed in reference to satellite communications, it also would be applicable to other communication systems. Such systems include for example, CATV-type networks and certain local area networks (LANS), where a "head-end" (analogous to satellite transponders) would translate "upstream" channels (analogous to satellite uplink channels) to "downstream" channels (analogous to satellite downlink channels).

By extending the subdivision of the frequency bands and their combinations with various arrangements of spot beams, up to N satellites with N transponders each can be located at each orbit position. This allows the possibility of extensive frequency reuse and frequency conservation, and also allows each earth station to access a larger number of earth stations.

Figure 10A:
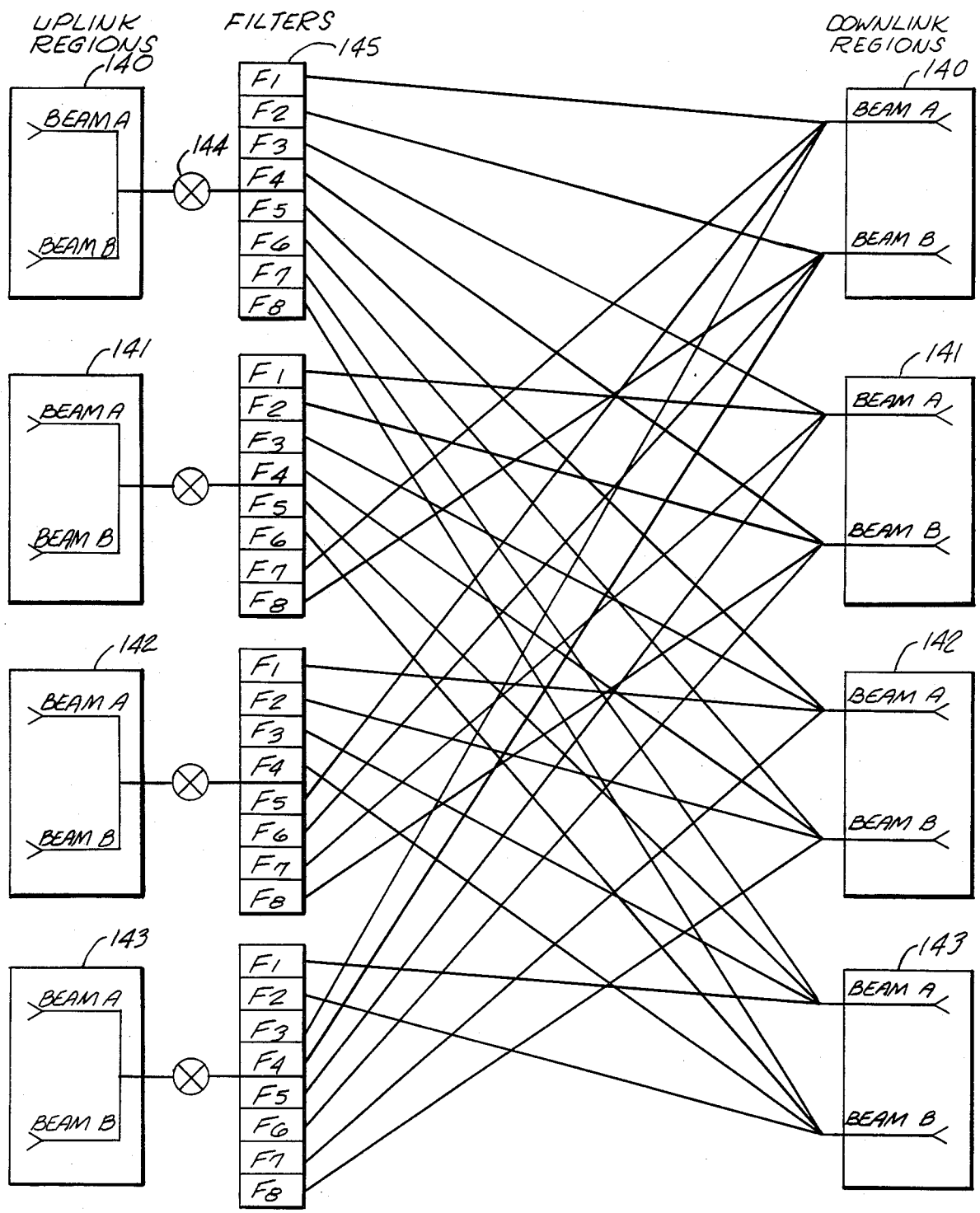
FIG. 10A shows a block diagram for a satellite system with eight spot beams and wherein the available frequency spectrum is used four times.

FIG. 10A shows a satellite system which is broken down into four regions with two spot beams in each region. The configuration allows for use of a frequency spectrum four times. If the frequency spectrum used by the satellite is from 11.7 GHz to 12.2 GHz, then there is a bandwidth of 500 MHz. Each of the frequency ranges $F_1$ to $F_8$ shown in FIG. 10B could have the same bandwidth of 62.5 MHz as shown in FIG. 10C or different ranges could have different bandwidths. Frequency ranges $F_1$ through $F_8$ account for a total bandwidth of 500 MHz. If an earth station in spot beam A in region 140 desires to communicate with spot beam B in region 142, then it would transmit its signal on a carrier frequency in the $F_6$ frequency range, which in turn would automatically route that signal to beam B in region 142 of the downlink regions. Uplink Region 140, in this example, is the same as downlink region 140 and so on. If spot beam A in uplink region 140 desired to communicate with spot beam B in downlink region 140, it would transmit its signal on a carrier frequency in the $F_2$ frequency range. FIG. 10B shows the frequency ranges $F_1$ through $F_8$. These frequencies are used four times in the system shown in FIG. 10A. The regions 140, 141, 142 and 143 in FIG. 10A and the spot beams in each region can be separated by one or more of the techniques described earlier. For example, regions 140 and 142 could use vertical polarization, and regions 141 and 143 could use horizontal polarization with beams A and B in each region using different frequencies in the downlinks while sharing frequencies in the uplinks.

FIG. 12 shows a system providing full four-fold frequency use. The coverage is broken out into four regions 170, 171, 172 and 173 with two beams per region. Orthogonal wave polarizations are used in abutting regions so that full frequency spectrum use for both the uplinks and downlinks can be achieved without interference. Regions using the same polarizations are isolated from each other by fast roll-off antenna beams and contoured coverage patterns. The uplink frequencies in range $F_1$ through $F_8$ are shared by beam 1 and beam 2 in region 170. The beams in region 170 are vertically polarized, whereas the adjacent beams using the same frequencies in region 171 are horizontally polarized. The downlink frequency ranges $G_1$ through $G_8$ in region 170 are likewise divided between beam 1 and beam 2 as shown in FIG. 12.

FIG. 11 is a representative diagram of a network system using a satellite such as that shown in FIG. 10A. The switching arrangement is functionally a star system with a satellite 160 at the center. Although the NCC is on the ground and not in the satellite, the network functions in all respects like a star network, except that signalling requests and frequency assignments may involve a double hop communications link.

The technique described herein provides the ability to implement a star architecture with flexible bit rate (or bandwidth) assignment to large numbers of small earth stations over a large area. No other terrestrial or satellite network offers such capabilities.

While the preferred embodiments of the present system have been described and disclosed, modifications and substitutions will be apparent to those skilled in the art, and it is intended to cover those modifications and substitutions.

What is claimed is:

1. A communication system for providing communication routes between a plurality of communication points, comprising frequency-selective routing array means having a plurality of electronic paths wherein each electronic path is distinct from each other electronic path and said frequency-selective routing array means is adapted to receive electronic signals and transmit electronic signals and is adapted to be located within an airborne satellite, and network control means located on the ground and physically apart form said frequency-selective routing array means and adapted to communicate with said communication points and adapted to select carrier frequencies for communications between said communication points and through said frequency-selective routing array means and wherein the frequency of said selected carrier frequencies determines which electronic path is used.

2. A communication system as in claim 1 wherein said satellite is adapted to use spot beams and said frequency-selective routing array means is adapted to communicate with said communication points using spot beams and wherein said network control means is adapted to communicate with said frequency-selective routing array means using spot beams.

3. A communication system as in claim 2 wherein each said electronic path of said frequency-selective routing array means corresponds to a different carrier frequency and wherein said network control means is adapted to select a particular carrier frequency to be used by each communication point for communications between communication points through said frequency-selective routing array means.

4. A spot beam satellite communication system for providing communication routes between a plurality of ground stations comprising frequency-selective routing array means having a plurality of electronic paths wherein each electronic path is distinct from each other electronic path and said frequency-selective routing array means is adapted to receive and transmit electronic signals and to be located within an airborne satellite adapted to use spot beams, network control means physically apart from said frequency-selective routing array means and located on the ground, and adapted to communicate with said ground stations and to select carrier frequencies for communications with said ground stations and through said frequency-selective routing array means, and wherein the frequency of said selected carrier frequency determines which electronic path is used, and spot beam antenna means located on said satellite and adapted to transmit electronic signals as said spot beams and to receive electronic signals from said ground stations.

5. A spot beam satellite communication system for providing communication routes between a plurality of ground stations comprising satellite means adapted to be airborne, frequency-selective routing array means having a plurality of electronic paths wherein each electronic path is distinct from each other electronic path and said frequency-selective routing array means is adapted to receive and transmit electronic signals and to be located within said satellite, ground stations adapted to transmit signals and to receive signals from said satellite means, network control means physically apart from said frequency-selective routing array means and located on the ground, and adapted to communicate with sad ground stations and to select carrier frequencies for communications between said ground stations and through said frequency-selective routing array means, and wherein the frequency of said selected carrier frequency determines which electronic path is used, and spot beam antenna means located on said satellite and adapted to transmit electronic signals as spot beams and to receive electronic signals from said ground stations.

6. A system as in claim 5 including fractional filter means wherein a fractional filter is in each said electronic path.

* * * * *